(12) United States Patent
Ishii et al.

(10) Patent No.: US 7,357,216 B2
(45) Date of Patent: Apr. 15, 2008

(54) ELECTRIC POWER STEERING APPARATUS

(75) Inventors: Nobuhiro Ishii, Gunma (JP); Hisao Ubukata, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 462 days.

(21) Appl. No.: 11/079,527

(22) Filed: Mar. 15, 2005

(65) Prior Publication Data
US 2005/0257991 A1 Nov. 24, 2005

(30) Foreign Application Priority Data
Mar. 15, 2004 (JP) .............................. 2004-073398

(51) Int. Cl.
*B62D 5/04* (2006.01)
*F16H 1/16* (2006.01)

(52) U.S. Cl. .................... 180/444; 180/446; 74/427

(58) Field of Classification Search ............... 180/443, 180/444, 446; 74/427; 73/862.333
See application file for complete search history.

(56) References Cited

U.S. PATENT DOCUMENTS 6,000,491 A * 12/1999 Shimizu et al. ............. 180/444
6,328,128 B1 * 12/2001 Chikaraishi ................. 180/446
6,390,230 B1 * 5/2002 Shimizu et al. ............. 180/444
6,456,090 B1 * 9/2002 Ishikawa et al. ............ 324/546
6,470,993 B1 * 10/2002 Matsuda et al. ............ 180/444
6,595,074 B2 * 7/2003 Shimizu et al. ......... 73/862.333
6,707,182 B2 * 3/2004 Yamanaka et al. ........ 310/67 R
6,805,017 B2 * 10/2004 Chikaraishi et al. .... 74/388 PS
6,848,534 B2 * 2/2005 Toyofuku et al. ........... 180/444
7,013,741 B2 * 3/2006 Nakamura et al. ..... 73/862.333

FOREIGN PATENT DOCUMENTS

JP    11-105721 A    4/1999
JP    2000-095120 A  4/2000

* cited by examiner

*Primary Examiner*—Lesley D. Morris
*Assistant Examiner*—Marc A. Scharich
(74) *Attorney, Agent, or Firm*—Sughrue Mion, PLLC

(57) ABSTRACT

A ball bearing 34 serving as a support reference for a pinion shaft 2 is located directly under a worm wheel 51. Thus, even when a temperature change occurs around the electric power steering apparatus, the engagement position between the worm wheel 51 and the worm 53 shifts only slightly in the axial direction of the pinion shaft 2. Furthermore, a bearing hole 47 into which an outer race of a lower needle bearing 36 is pressed and a bearing hole 45 into which an outer race of an upper ball bearing 34 is pressed are formed in a common lower gear box 41, and can be fabricated by through processing using a boring tool from the bearing hole 45 side.

8 Claims, 11 Drawing Sheets

ELECTRIC POWER STEERING APPARATUS

BACKGROUND OF THE INVENTION

The present invention relates to an electric power steering apparatus and, in particular, to an electric power steering apparatus capable of maintaining a good engagement state between a worm wheel and a worm.

An example of a conventional electric power steering apparatus is shown in FIG. 8 where an electric power steering apparatus 01 has a supporting structure for a pinion shaft. The electric power steering apparatus 01 shown in FIG. 8 is an electric power steering apparatus of a pinion assist type. A lower end of a pinion shaft 02 is supported pivotally by a ball bearing 031 of a four-point contact type, while a lock nut 032 is screwed on a male screw 021 provided at the lower end of the pinion shaft 02. This lock nut 032 fixes the lower end of the pinion shaft 02 to an inner race of the ball bearing 031.

An outer race of the ball bearing 031 is pressed into a bearing hole 042 formed in a lower gear box 041. The outer race of the ball bearing 031 is pressed by an end cover 033 screwed into a female screw 043 of the bearing hole 042, and is thereby fixed to the lower gear box 041. As such, the pinion shaft 02 is supported in the thrust direction and the radial direction by the ball bearing 031. Thus, the ball bearing 031 that supports the lower end of the pinion shaft 02 serves as a support reference for the pinion shaft 02 relative to the lower gear box 041.

A core metal 052 of a worm wheel 051 which engages with a worm 053 in a worm reducer mechanism 05 is pressed over an upper end of the pinion shaft 02. The worm 053 is connected to an output shaft of an electric motor for steering assistance (not shown). Directly under the worm wheel 051, the pinion shaft 02 is pivotally supported solely in the radial direction by a ball bearing 034.

In an upper gear box 044 fixed to an upper end face of the lower gear box 041 by bolts (not shown), an input shaft 06 connected to a steering wheel via a steering shaft (not shown) is supported pivotally by a ball bearing 061 in a rotatable manner. In a torsion bar spring 063 an upper end of which is connected to the input shaft 06 by a pin 062, an outer periphery of a lower end of the torsion bar spring is supported pivotally by a bush 064, while the torsion bar spring is pressed into and thereby connected to the upper end of the pinion shaft 02 below the bush 064.

A torque sensor 07 that detects a torque acting on the torsion bar spring 063 has a sensor shaft part 071, sensing coils 073 and 074, and a cylindrical member 075. The sensor shaft part 071 is formed at a lower end of the input shaft 06. The sensing coils 073 and 074 are arranged inside a yoke 072 pressed into the upper gear box 044. The cylindrical member 075 is arranged between the sensor shaft part 071 and the sensing coils 073 and 074. The cylindrical member 075 is fixed to the upper end of the pinion-shaft 02. In the sensor shaft part 071, a plurality of ridges extending in the axial direction are formed at equal intervals in the circumferential direction. In the cylindrical member 075, a plurality of rectangular windows are formed in positions opposing the sensing coils 073 and 074 at equal intervals in the circumferential direction.

When the steering wheel is operated so that the input shaft 06 revolves, its torque is transmitted to the pinion shaft 02 via the torsion bar spring 063. At that time, resistance on a steered wheel side causes a torsion in the torsion bar spring 063 which connects the input shaft 06 with the pinion shaft 02. This causes a relative rotation between the ridges in the surface of the sensor shaft part 071 and the windows in the cylindrical member 075.

This relative rotation causes an increase or decrease in a magnetic flux generated in the sensor shaft part 071. The sensing coils 073 and 074 detect the change in the magnetic flux as an inductance change so as to detect a torque acting on the torsion bar spring 063 on the basis of the detection result. Then, the electric motor is driven so as to revolve the worm 053 with a necessary steering assist force. The revolution of the worm 053 is transmitted through the worm wheel 051, the pinion shaft 02, and the pinion 022 to the rack 023, and thereby changes the direction of the steered wheels via a tie rod (not shown) connected to the rack 023.

In a rack guide 08, an adjustment cover 084 pushes a roller 083 against a rear surface of the rack 023. The roller 083 is supported pivotally on a shaft 061 in a rotatable manner via a needle bearing 082. The adjustment cover 084 pushes the roller 083 against the rear surface of the rack 023 via a disc spring. This avoids backlash in the engagement part between the pinion 022 and the rack 023 so as to allow the rack 023 to move smoothly.

In the conventional electric power steering apparatus 01 shown in FIG. 8, the support reference for the pinion shaft 02 is located at the lower end distant from the worm wheel 051. Thus, when a temperature change occurs around the electric power steering apparatus, a difference in the thermal expansion coefficients of the gear boxes (made of aluminum) 041 and 044 and the pinion shaft (made of iron) 02 causes the engagement position between the worm wheel 051 and the worm 053 to shift in the axial direction of the pinion shaft 02. This prevents normal engagement, and hence causes problems such as the generation of noise in the engagement part and the occurrence of wear in the gear tooth surface.

The bearing hole 042 into which the outer race of the lower ball bearing 031 is pressed and the bearing hole 045 into which the outer race of the upper ball bearing 034 is pressed are difficult to be fabricated by through processing from one direction, and hence require inversed spot facing processing or alternatively processing where the lower gear box 041 is inverted. This increases the processing cost, but still the concentricity of the bearing holes is difficult to be maintained so that the swing of the worm wheel 051 becomes large. This prevents normal engagement, and hence causes problems such as the generation of noise in the engagement part and the occurrence of wear in the gear tooth surface.

Examples of electric power steering apparatuses that employ countermeasures against these problems are disclosed in Japanese Published Unexamined Patent Application No. 2000-95120 (Patent Document 1) and Japanese Published Unexamined Patent Application No. H11-105721 (Patent Document 2). FIG. 9 and FIG. 10 show electric power steering apparatuses according to Patent Document 1. FIG. 11 shows an electric power steering apparatus according to Patent Document 2. In the following description, like parts to FIG. 8 are designated by like numerals, and overlapping description is omitted. FIG. 9, FIG. 10, and FIG. 11 are taken from these references except for the numerals.

In an electric power steering apparatus 01 shown in FIG. 9 according to Patent Document 1, the lower end of the pinion shaft 02 is supported pivotally by a needle bearing 036, while directly above the worm wheel 051, the upper end of the pinion shaft 02 is supported pivotally by a ball bearing 035. An outer race of the ball bearing 035 is fixed into a bearing hole 048 in a middle gear box 046 by a lock nut 037.

A lower end face of a boss portion 054 of the worm wheel 051 is supported on the pinion shaft 02 by a retainer ring 024, while an inner race of the ball bearing 035 is clamped between an upper end face of the boss portion 054 of the worm wheel 051 and a step 025 of the pinion shaft 02. The ball bearing 034 which pivotally supports solely in the radial direction directly under the worm wheel 051 is kept intact similar to FIG. 8. As such, three bearings 035, 034, and 036 support pivotally the pinion shaft 02.

As described above, directly above the worm wheel 051, the ball bearing 035 supports pivotally the thrust direction and the radial direction of the pinion shaft 02. This configuration reduces a shift between the worm wheel 051 and the worm 053 in the axial direction caused by a temperature change.

In an electric power steering apparatus 01 shown in FIG. 10 according to Patent Document 1, the ball bearing 034 shown in FIG. 9 is omitted, while the needle bearing 036 is replaced by a ball bearing 031 so that the pinion shaft 02 is supported pivotally by two bearings. Similar to the electric power steering apparatus 01 of FIG. 9, directly above the worm wheel 051, the ball bearing 035 supports pivotally the thrust direction and the radial direction of the pinion shaft 02. This configuration reduces a shift between the worm wheel 051 and the worm 053 in the axial direction caused by a temperature change.

Nevertheless, in the electric power steering apparatus 01 of FIG. 9, the bearing hole 048 for the upper ball bearing 035 is formed in the middle gear box 046, while the bearing hole 045 for the middle ball bearing 034 and the bearing hole 047 for the lower needle bearing 036 are formed in the lower gear box 041. Furthermore, in the electric power steering apparatus 01 of FIG. 10, the bearing hole 048 for the upper ball bearing 035 is formed in the middle gear box 046, while the bearing hole 042 for the lower ball bearing 031 is formed in the lower gear box 041.

Thus, a discrepancy occurs when the middle gear box 046 and the lower gear box 041 are attached and working errors in the bearing holes are accumulated. This causes a problem that in order to ensure the concentricity between the bearing holes, a larger number of assembling steps are necessary.

In an eleric power steering apparatus 01 shown in FIG. 11 according to Patent Document 2, similarly to the electric power steering apparatus 01 of FIG. 10, directly under the worm wheel 051, the ball bearing 035 supports pivotally the thrust direction and the radial direction of the pinion shaft 02. This configuration reduces a shift between the worm wheel 051 and the worm 053 in the axial direction caused by a temperature change.

Nevertheless, in the electric power steering apparatus 01 of FIG. 11, the outer periphery of the outer race of the upper ball bearing 035 is supported by a gear box 040 via a bearing hole 048 formed in a ring nut 038.

Thus, accumulated are: a deviation in the concentricity caused by a working error between a female screw 049 formed in the gear box 040 so that the ring nut 038 is screwed therein and a bearing hole 047 for the lower needle bearing 036; and a deviation in the concentricity caused by a working error between a male screw in the ring nut 038 outer periphery and the bearing hole 048. Thus, the swing of the worm wheel 051 becomes large. This prevents normal engagement, and hence causes problems such as the generation of noise in the engagement part and the occurrence of wear in the gear tooth surface.

[Patent Document 1]
Japanese Published Unexamined Patent Application No. 2000-95120

[Patent Document 2]
Japanese Published Unexamined Patent Application No. H11-105721

SUMMARY OF THE INVENTION

An object of the present invention is to provide an electric power steering apparatus that has only a small shift in an engagement position between a worm wheel and a worm caused by a temperature change, that is fabricated by easy processing, that has only a small deflection when a worm wheel is attached, and that is assembled easily.

This object is solved by the following means. That is, a first aspect of the present invention is an electric power steering apparatus including: a gear box; an input shaft inserted through the gear box; a pinion shaft, an upper end of which is connected to a lower end of the input shaft via a torsion bar spring, and which is accommodated in the gear box; a rack that engages with a pinion formed in a lower portion of the pinion shaft, and thereby transmits a steering force to a wheel side; a torque sensor that detects a torque acting on the torsion bar spring; an electric motor that outputs a predetermined steering assist force depending on a detected value in the torque sensor; a worm that is connected to an output shaft of the electric motor, and that engages with a worm wheel connected to an upper portion of the pinion shaft; and a first bearing that supports, directly under the worm wheel, the pinion shaft pivotally in a radial direction and a thrust direction relative to the gear box.

A second aspect of the invention is the electric power steering apparatus according to the first aspect of the invention, wherein the first bearing is a ball bearing, and wherein an inner race of the ball bearing is clamped between a step formed in an outer periphery of the pinion shaft or a boss portion of the worm wheel and any one of a caulking ring, a retainer ring, or a nut attached to the pinion shaft.

A third aspect of the invention is the electric power steering apparatus according to the second aspect of the invention, wherein in an outer race of the ball bearing, an outer periphery thereof is supported in a bearing hole of the gear box, while an axial direction thereof is fixed to the gear box by a hollow ring nut disposed between the ball bearing and the worm wheel.

A fourth aspect of the invention is the electric power steering apparatus according to the third aspect of the invention, wherein an engaging recess is formed in a worm-wheel-side end face of the ring nut, and wherein a tool insertion hole opposing the engaging recess is formed in the worm wheel, whereby a tightening tool is caused to engage with the engaging recess through the tool insertion hole from above the worm wheel, and then the worm wheel and the pinion shaft are rotated so that the ring nut is screwed into the gear box.

A fifth aspect of the invention is the electric power steering apparatus according to the fourth aspect of the invention, wherein in the rack, a thread relief that permits idling of the pinion is formed outside a stroke end of the rack, whereby when the ring nut is screwed into the gear box, the pinion freely revolves in the thread relief of the rack.

A sixth aspect of the invention is the electric power steering apparatus according to any one of the first to the fifth aspects of the invention, wherein the pinion shaft is supported pivotally in a radial direction below the pinion in the gear box by a second bearing.

A seventh aspect of the invention is the electric power steering apparatus according to the sixth aspect of the invention, wherein the second bearing is either a needle bearing or a ball bearing.

An eighth aspect of the invention is the electric power steering apparatus according to the sixth or the seventh aspect of the invention, wherein outer races of the first bearing and the second bearing are attached to a common gear box.

A ninth aspect of the invention is the electric power steering apparatus according to the eighth aspect of the invention, wherein the bearing hole in the gear box to which the outer races of the first bearing and the second bearing are attached can be fabricated by through processing from one direction.

DETAILED DESCRIPTION OF THE PREFERRED EMBODIMENTS

Figure 1:
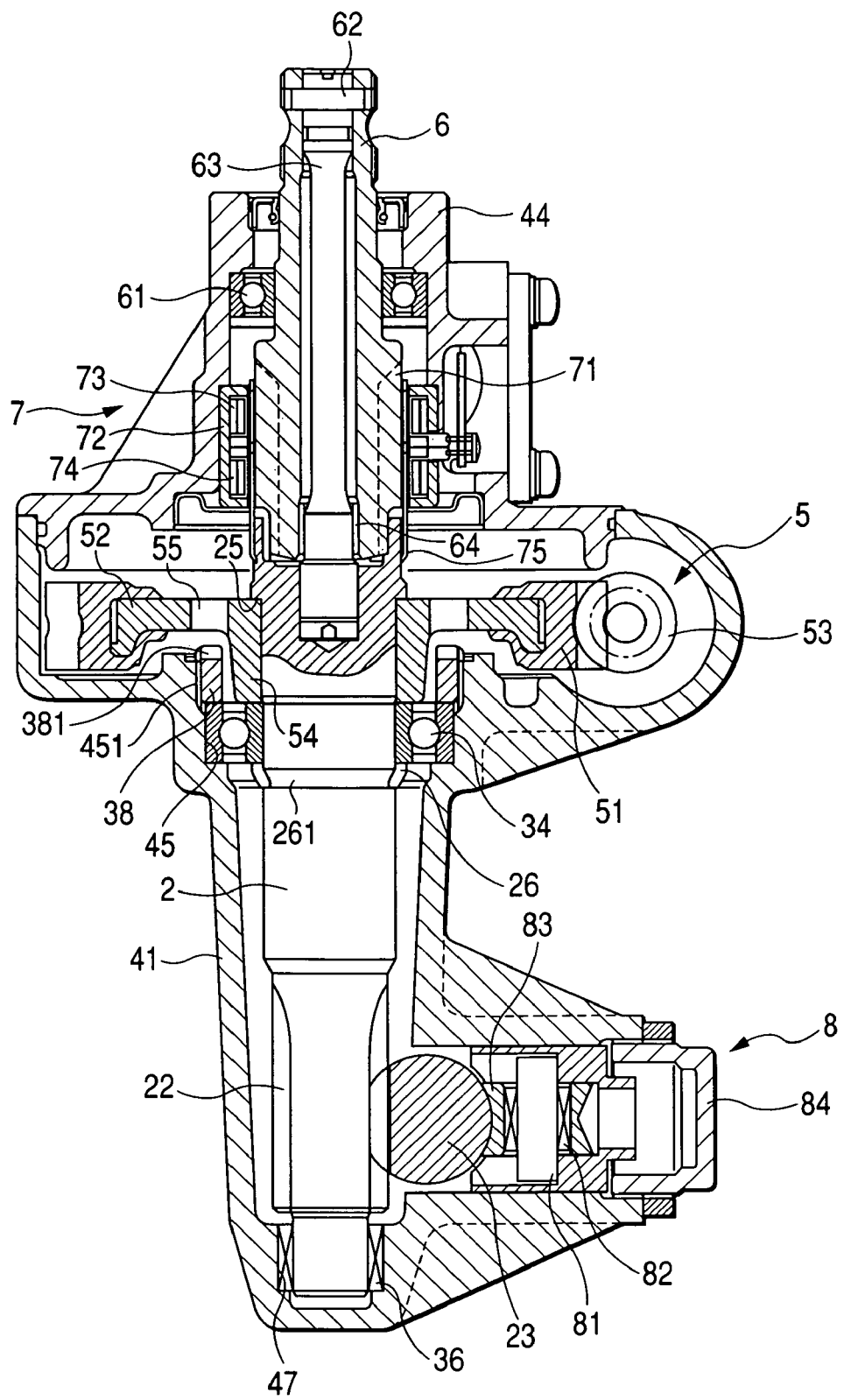
FIG. 1 is a longitudinal sectional view of an electric power steering apparatus according to a first embodiment of the invention in which an inner race of a ball bearing is fixed by a caulking ring, taken along the axis line of an input shaft.

A first embodiment of the present invention is described below with reference to the drawings. FIG. 1 is a longitudinal sectional view of an electric power steering apparatus according to the first embodiment of the invention in which an inner race of a ball bearing is fixed by a caulking ring, taken along the axis line of an input shaft.

The electric power steering apparatus 1 shown in FIG. 1 is an electric power steering apparatus of pinion assist type. A core metal 52 of a worm wheel 51 that engages with a worm 53 in a worm reducer mechanism 5 is pressed into an upper end of a pinion shaft 2. An upper end face of the core metal 52 contacts with a step 25 of the pinion shaft 2 so as to restrict the core metal 52 from being moved upward relative to the pinion shaft 2. The worm 53 is connected to an output shaft of an electric motor for steering assistance (not shown).

Directly under the worm wheel 51, the pinion shaft 2 is supported pivotally in a lower gear box 41 by a ball bearing 34 of four-point contact type. A caulking ring 26 attached and caulked in a groove 261 in the pinion shaft 2 clamps an inner race of the ball bearing 34 against a lower end face of a boss portion 54 of the core metal 52. An outer race of the ball bearing 34 is pressed into a bearing hole 45 formed directly in the lower gear box 41, then is pressed in the axial direction by a ring nut 38 screwed into a female screw 451 of the bearing hole 45, and is thereby fixed to the lower gear box 41.

A lower end of the pinion shaft 2 is pivotally supported solely in the radial direction by a needle bearing 36 in the lower gear box 41. As such, the pinion shaft 2 is supported in the thrust direction and the radial direction by the ball bearing 34. Thus, the ball bearing 34 that supports an upper end of the pinion shaft 2 serves as a support reference for the pinion shaft 2 relative to the lower gear box 41.

An upper gear box 44 is fixed to an upper end face of the lower gear box 41 by bolts (not shown). In the upper gear box 44, an input shaft 6 is supported pivotally by a ball bearing 61 in a rotatable manner. The input shaft 6 is connected to a steering wheel via a steering shaft (not shown). In a torsion bar spring 63 an upper end of which is connected to the input shaft 6 by a pin 62, an outer periphery of a lower end of the torsion bar spring 63 is supported pivotally by a bush 64, while the torsion bar spring 63 is pressed into and thereby connected to the upper end of the pinion shaft 2 below the bush 64.

A torque sensor 7 that detects a torque acting on the torsion bar spring 63 has a sensor shaft part 71, sensing coils 73 and 74, and a cylindrical member 75. The sensor shaft part 71 is formed at a lower end of the input shaft 6. The sensing coils 73 and 74 are arranged inside a yoke 72 pressed into the upper gear box 44. The cylindrical member 75 is arranged between the sensor shaft part 71 and the sensing coils 73 and 74.

The cylindrical member 75 is fixed to the upper end of the pinion shaft 2. In the sensor shaft part 71, a plurality of ridges extending in the axial direction are formed at equal intervals in the circumferential direction. In the cylindrical member 75, a plurality of rectangular windows are formed in positions opposing the sensing coils 73 and 74 at equal intervals in the circumferential direction.

When the steering wheel is operated and the input shaft 6 revolves, its torque is transmitted to the pinion shaft 2 via the torsion bar spring 63. At that time, resistance on a steered wheel side causes a torsion in the torsion bar spring 63 which connects the input shaft 6 with the pinion shaft 2. This causes a relative rotation between the ridges in the surface of the sensor shaft part 71 and the windows in the cylindrical member 75.

This relative rotation causes an increase or decrease in a magnetic flux generated in the sensor shaft part 71. The sensing coils 73 and 74 detect the change in the magnetic flux as an inductance change so as to detect a torque acting on the torsion bar spring 63 on the basis of the detection result. Then, the electric motor is driven so as to revolve the worm 53 with a necessary steering assist force. The revolution of the worm 53 is transmitted through the worm wheel 51, the pinion shaft 2, and the pinion 22 to the rack 23, and thereby changes the direction of the steered wheels via a tie rod (not shown) connected to the rack 23.

In a rack guide 8, an adjustment cover 84 always pushes a roller 83 against a rear surface of the rack 23. The roller 83 is supported pivotally on a shaft 81 in a rotatable manner via a needle bearing 82. The adjustment cover 84 pushes the roller 83 against the rear surface of the rack 23 via a disc spring. This avoids backlash in the engagement part between the pinion 22 and the rack 23 so as to allow the rack 23 to move smoothly.

In this electric power steering apparatus 1 according to the first embodiment, the ball bearing 34 serving as the support reference for the pinion shaft 2 is located directly under the worm wheel 51. Thus, even when a temperature change occurs around the electric power steering apparatus, the engagement position between the worm wheel 51 and the worm 53 shifts only slightly in the axial direction of the pinion shaft 2. This ensures normal engagement, and hence avoids the generation of noise in the engagement part and the occurrence of wear in the gear tooth surface.

Furthermore, the bearing hole 47 into which the outer race of the lower needle bearing 36 is pressed and the bearing hole 45 into which the outer race of the upper ball bearing 34 is pressed are formed in the same lower gear box 41. At the same time, these two holes can be fabricated using a boring tool by through processing from the bearing hole 45 side. This reduces the machining time, and yet improves the concentricity of the bearing holes so as to reduce the swing of the worm wheel 51. This avoids the generation of noise in the engagement part and the occurrence of wear in the gear tooth surface.

Furthermore, the bearing hole 45 into which the outer race of the upper ball bearing 34 is pressed is formed directly in the lower gear box 41. This avoids the accumulation of working errors in the bearing holes, and hence improves the concentricity of the bearing holes so as to reduce the swing of the worm wheel.

The tightening of the above-mentioned ring nut 38 is performed by the following method. In the upper end face of the ring nut 38, a plurality of engaging recesses (grooves or holes) 381 are formed on the same circumference. In the core metal 52 of the worm wheel 51, a plurality of tool insertion holes 55 are formed on the same circumference as the engaging recesses 381 and at the same angular positions as the engaging recesses 381.

A fork-shaped tightening tool is inserted through the tool insertion holes 55 into the engaging recesses 381. When the tightening tool is turned, the ring nut 38 rotates and the outer race of the pole bearing 34 can be tightened. At the same time as the operation of tightening the ring nut 38, the core metal 52 provided with the tool insertion holes 55, together with the worm wheel 51, is turned by the tightening tool. Thus, the pinion shaft 2 and the pinion 22 fixed to the worm wheel 51 rotate so that the rack 23 engaging with the pinion 22 moves.

Figure 12:
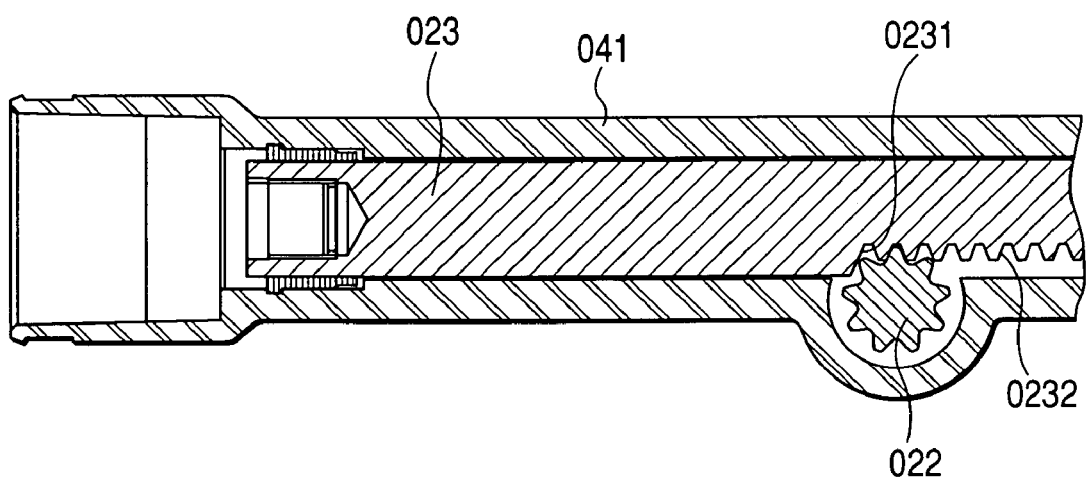
FIG. 12 is a sectional view of a rack of a conventional electric power steering apparatus in a state where a tooth of a pinion contacts with an end of rack teeth.

FIG. 12 is a sectional view of a conventional electric power steering apparatus 01 taken along the axis line of a rack 023. In the conventional electric power steering apparatus 01, when the pinion 022 shown in FIG. 12 rotates so that the rack 023 moves to the stroke end, a tooth of the pinion 022 contacts with the end 0231 of the rack teeth 0232 of the rack 023 so that the motion stops. Thus, at each time of stop, the rack 023 needs to be returned in the reverse direction so that the work of tightening the ring nut 38 needs to be restarted. This has caused the problem of an increase in the number of assembling steps.

Figure 6:
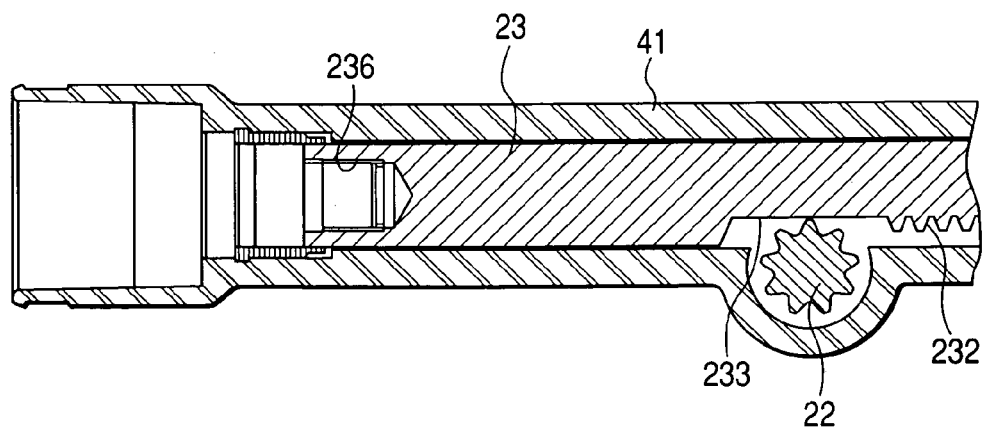
FIG. 6 is a sectional view of a rack of an electric power steering apparatus according to the invention in a state where a thread relief formed in the rack is positioned at a pinion so that the pinion can revolve freely when a ring nut is tightened.

In the electric power steering apparatus 1 according to the invention, as shown in FIG. 6, in the rack 23, a thread relief 233 is formed by extending the bottom surface of the rack teeth 232 toward the outside of a stroke end (use range). Thus, in the work of tightening the ring nut 38, the rack 23 is moved by hand so that the pinion 22 is located in the position of the thread relief 233. By virtue of this, even when the pinion 22 revolves, the rack 23 does not move. Thus, the work of tightening the ring nut 38 can be completed by rotating the pinion 22 as many revolutions as necessary. This reduces the necessary time for the assembling work.

Figure 7:
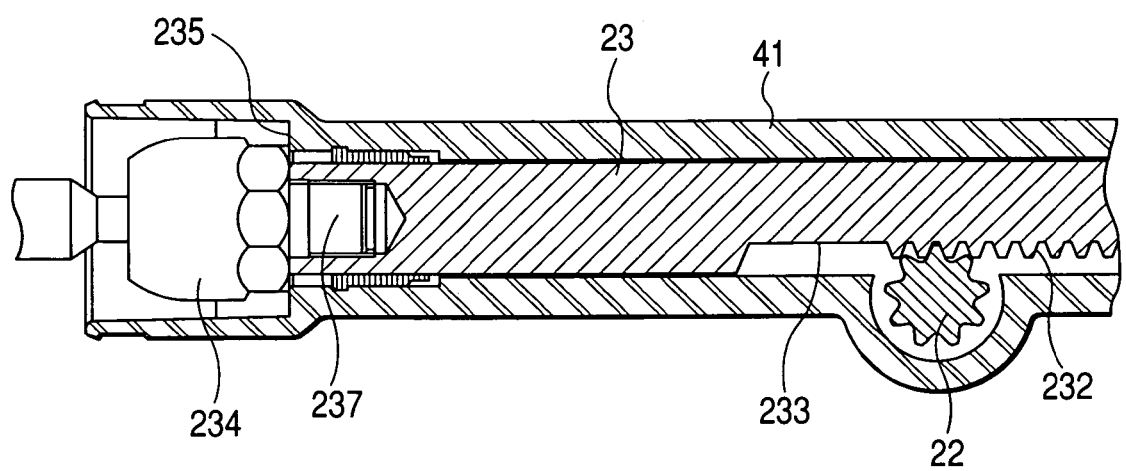
FIG. 7 is a sectional view of a rack of an electric power steering apparatus according to the invention in a state where after the completion of tightening of a ring nut, a rack end is attached to a rack end face so that the stroke of the rack is restricted.
Figure 8:
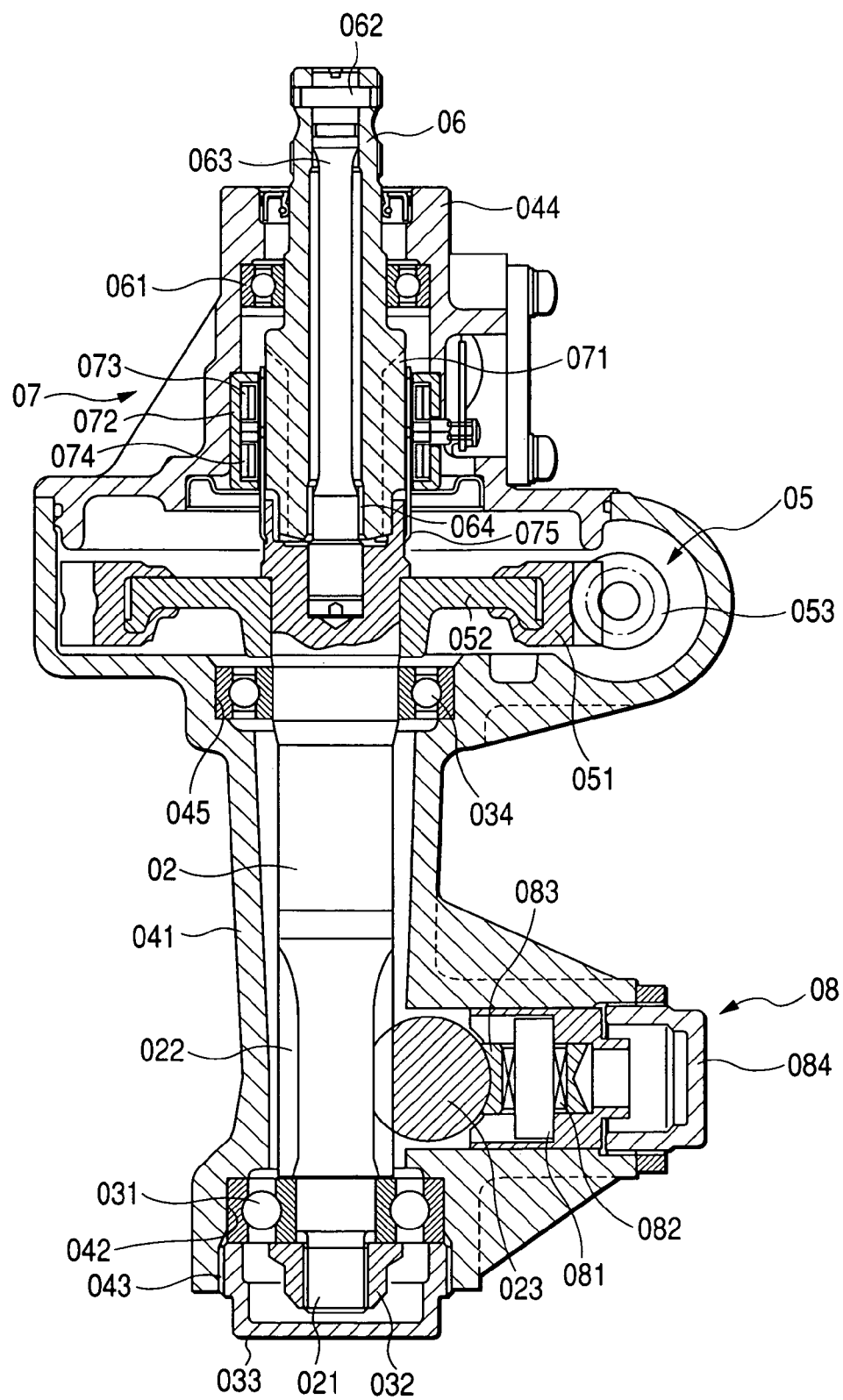
FIG. 8 is a longitudinal sectional view of a conventional electric power steering apparatus, taken along the axis line of an input shaft.
Figure 9:
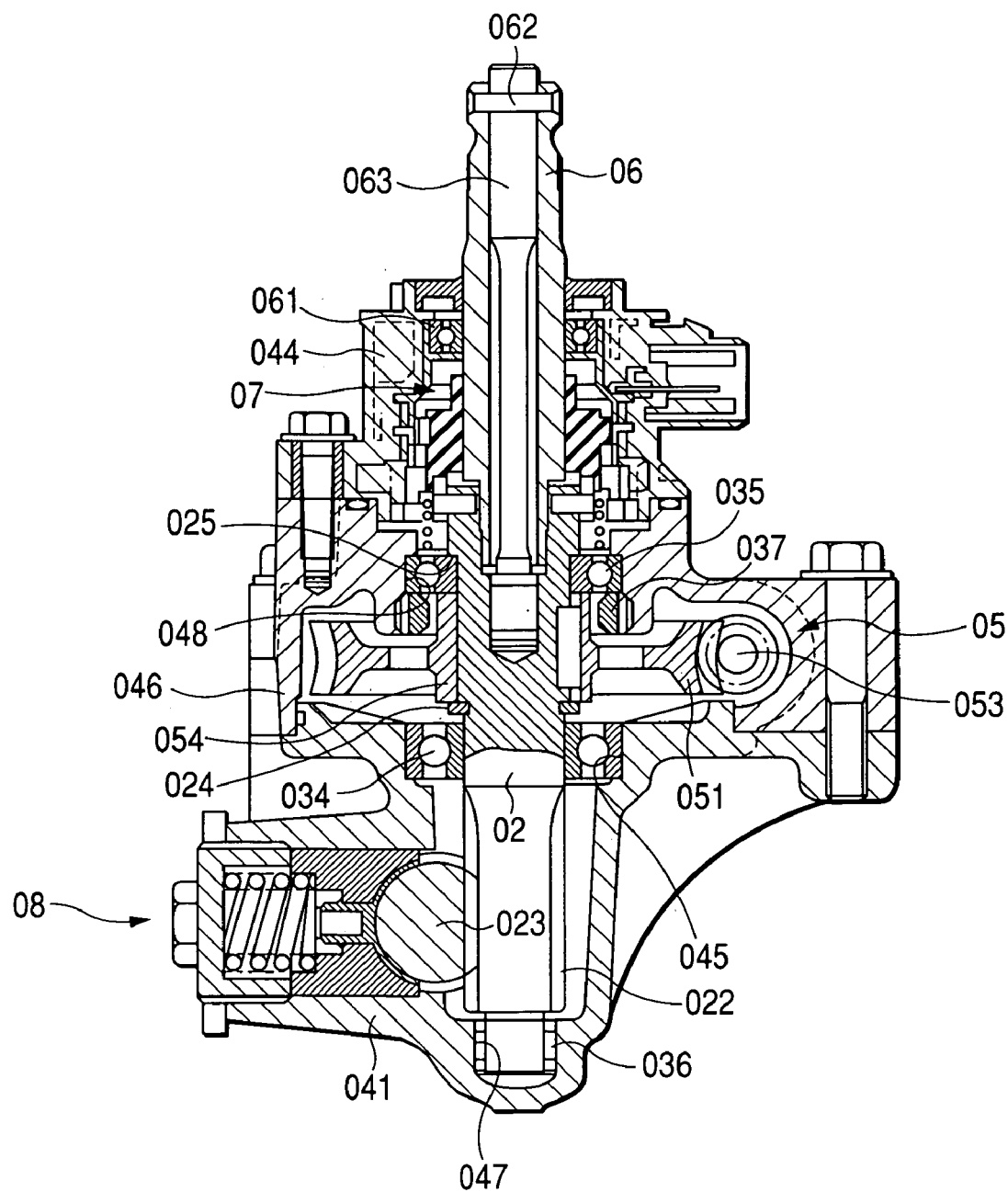
FIG. 9 is a longitudinal sectional view of another example of a conventional electric power steering apparatus, taken along the axis line of an input shaft.
Figure 10:
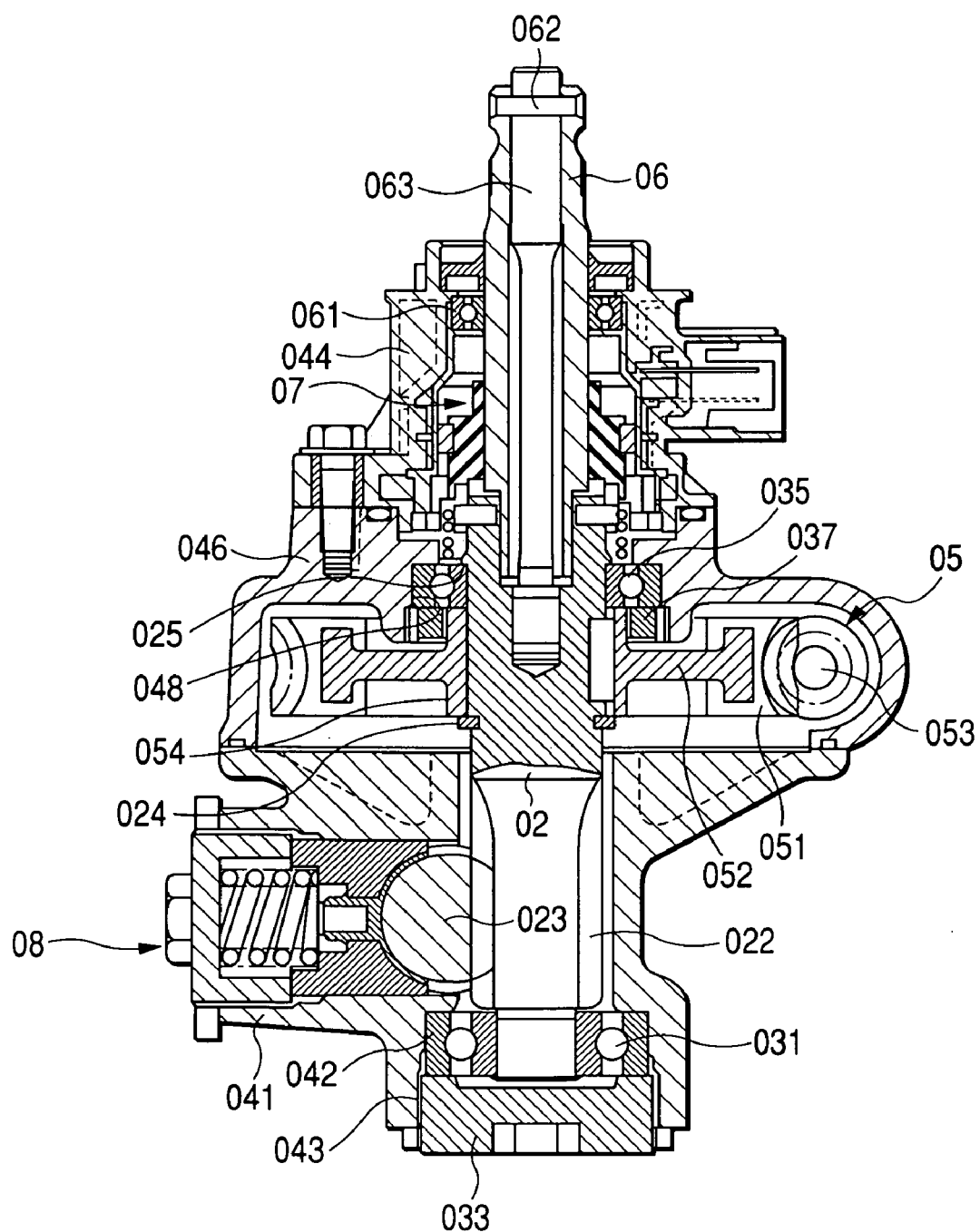
FIG. 10 is a longitudinal sectional view of still another example of a conventional electric power steering apparatus, taken along the axis line of an input shaft.
Figure 11:
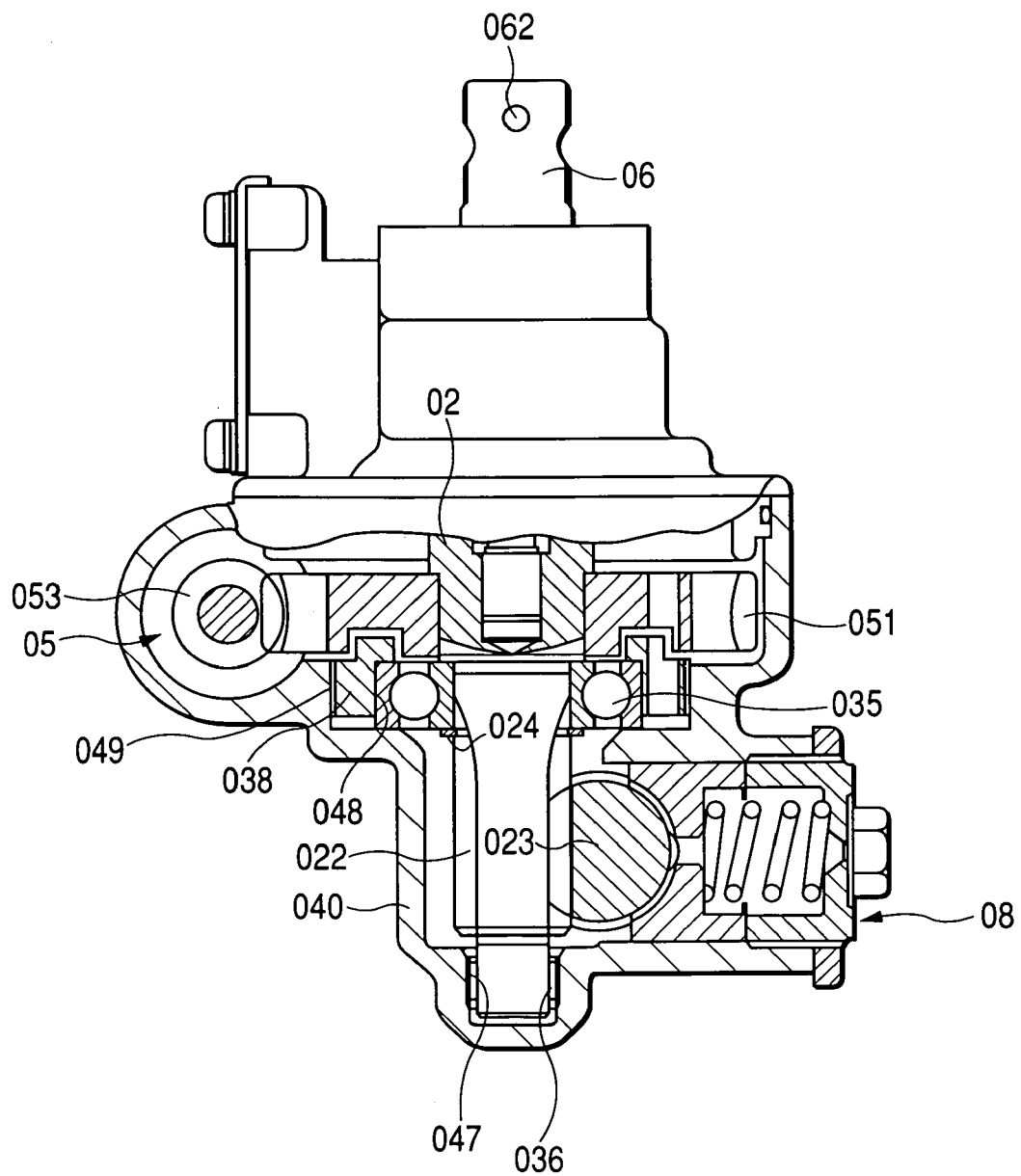
FIG. 11 is a longitudinal sectional view of still another example of a conventional electric power steering apparatus, taken along the axis line of an input shaft.

When the work of tightening the ring nut 38 is completed, as shown in FIG. 7, a male screw 237 of a rack end 234 is screwed and fixed into a female screw 236 of an end face of the rack 23. According to this configuration, in the stroke end of the rack 23, the end face of the rack end 234 contacts with a rack stroke restriction part 235 in the lower gear box 41. This makes it possible to restrict the rack teeth 232 of the rack 23 from separating from the pinion 22.

Figure 2:
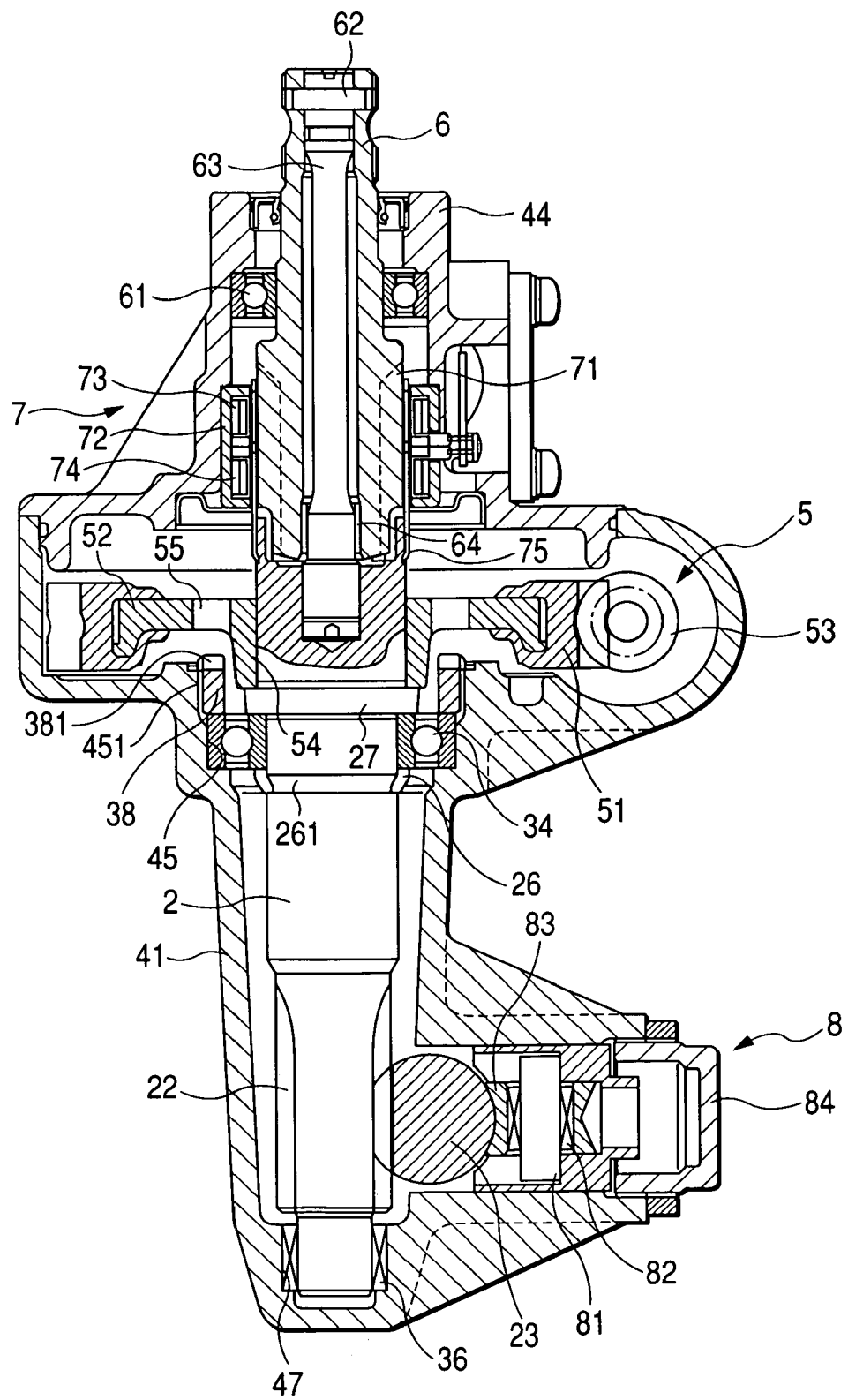
FIG. 2 is a longitudinal sectional view of an electric power steering apparatus according to a second embodiment of the invention in which a worm wheel in the press fit direction is reversed to that of FIG. 1, taken along the axis line of an input shaft.

A second embodiment of the invention is described below with reference to FIG. 2. In the second embodiment, the fixing of the inner race of the ball bearing 34 to the pinion shaft 2 is performed by a different method from the first embodiment. In the following description, like parts to the first embodiment are designated by like numerals, and overlapping description is omitted.

In the first embodiment, the core metal 52 of the worm wheel 51 has been pressed from the below of the pinion shaft 2. In the second embodiment, the core metal 52 of the worm wheel 51 is pressed from above the pinion shaft 2. Furthermore, the lower end face of the boss portion 54 of the core metal 52 contacts with an upper end face of a step 27 in the pinion shaft 2 so that the position in the axial direction of the worm wheel 51 is defined relative to the pinion shaft 2.

The inner race of the ball bearing 34 is clamped between the lower end face of the step 27 in the pinion shaft 2 and the caulking ring 26 attached and caulked in the groove 261 in the pinion shaft 2, and is thereby fixed to the pinion shaft 2. The method of fixing the outer race of the ball bearing 34 is the same as in the first embodiment. That is, the outer race is pressed into the bearing hole 45 formed in the lower gear box 41, then is pressed by the ring nut 38 screwed into the female screw 451 of the bearing hole 45, and is thereby fixed to the lower gear box 41.

The method of pivotally supporting the lower end of the pinion shaft 2 by means of the needle bearing 36 is also the same as in the first embodiment. That is, also in the second embodiment, the pinion shaft 2 is supported in the thrust direction and the radial direction by the ball bearing 34 located directly under the worm wheel 51. Thus, the ball bearing 34 that supports the upper end of the pinion shaft 2 serves as the support reference for the pinion shaft 2 relative to the lower gear box 41.

Also, in this electric power steering apparatus 1 according to the second embodiment, the ball bearing 34 serving as the support reference for the pinion shaft 2 is located directly under the worm wheel 51. Thus, even when a temperature change occurs around the electric power steering apparatus, the engagement position between the worm wheel 51 and the worm 53 is always maintained in a normal engagement state.

Figure 3:
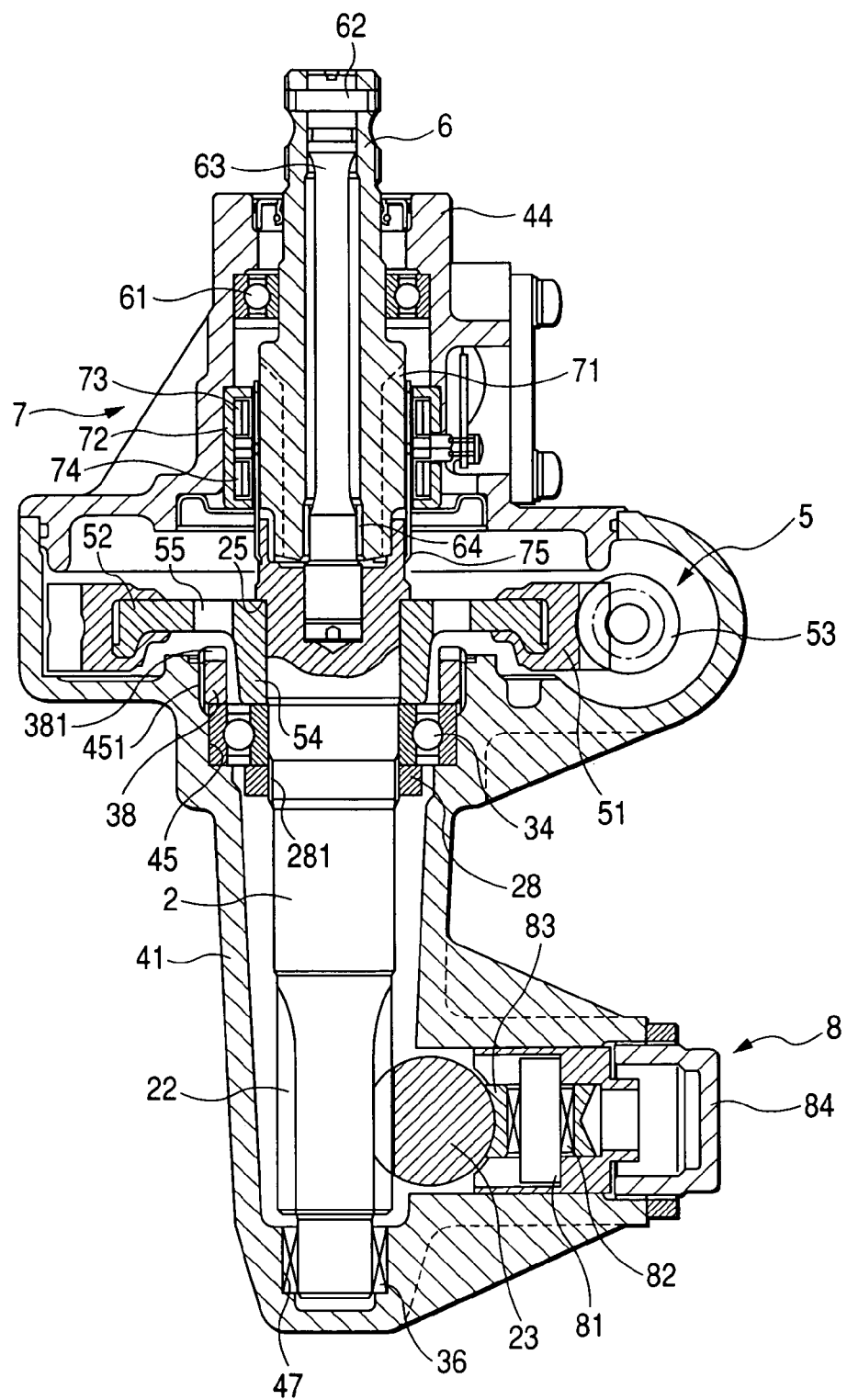
FIG. 3 is a longitudinal sectional view of an electric power steering apparatus according to a third embodiment of the invention in which an inner race of a ball bearing is fixed by a nut, taken along the axis line of an input shaft.

A third embodiment of the invention is described below with reference to FIG. 3. Also, in the third embodiment, the fixing of the inner race of the ball bearing 34 to the pinion shaft 2 is performed by a different method from the first embodiment. In the following description, like parts to the first embodiment are designated by like numerals, and overlapping description is omitted.

In the first embodiment, the inner race of the ball bearing 34 has been fixed by the caulking ring 26 attached and caulked in the groove 261 of the pinion shaft 2. In the third embodiment, a nut 28 is screwed on a male screw 281 formed in the pinion shaft 2. Then, the inner race of the ball bearing 34 is clamped between the upper end face of the nut 28 and the lower end face of the boss portion 54 of the core metal 52. The core metal 52 of the worm wheel 51 in the press fit direction over the pinion shaft 2 is the same as in the first embodiment.

The method of fixing the outer race of the ball bearing 34 and the method of pivotally supporting the lower end of the pinion shaft 2 by means of the needle bearing 36 are the same as in the first embodiment. That is, also in the third embodiment, the pinion shaft 2 is supported in the thrust direction and the radial direction by the ball bearing 34 located directly under the worm wheel 51. Thus, the ball bearing 34 that supports the upper end of the pinion shaft 2 serves as the support reference for the pinion shaft 2 relative to the lower gear box 41.

Also, in this electric power steering apparatus 1 according to the third embodiment, the ball bearing 34 serving as the support reference for the pinion shaft 2 is located directly under the worm wheel 51. Thus, even when a temperature change occurs around the electric power steering apparatus, the engagement position between the worm wheel 51 and the worm 53 is always maintained in a normal engagement state.

Figure 4:
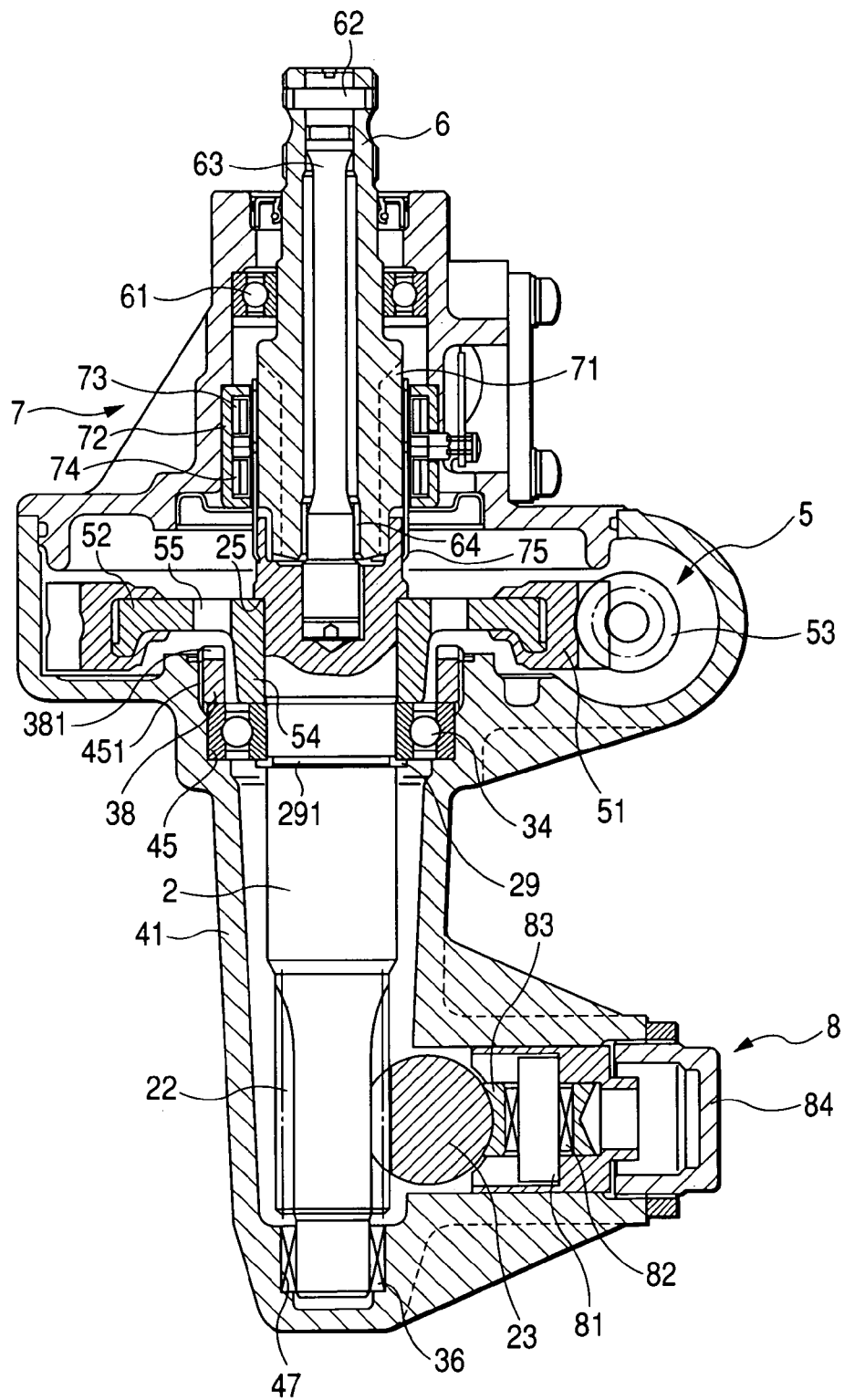
FIG. 4 is a longitudinal sectional view of an electric power steering apparatus according to a fourth embodiment of the invention in which an inner race of a ball bearing is fixed by a retainer ring, taken along the axis line of an input shaft.

A fourth embodiment of the invention is described below with reference to FIG. 4. Also, in the fourth embodiment, the fixing of the inner race of the ball bearing 34 to the pinion shaft 2 is performed by a different method from the first embodiment. In the following description, like parts to the first embodiment are designated by like numerals, and overlapping description is omitted.

In the first embodiment, the inner race of the ball bearing 34 has been fixed by the caulking ring 26 attached and caulked in the groove 261 of the pinion shaft 2. In the fourth embodiment, a retainer ring (snap ring for shaft) 29 is attached to a ring groove 291 formed in the pinion shaft 2. Then, the inner race of the ball bearing 34 is clamped between the upper end face of the retainer ring 29 and the lower end face of the boss portion 54 of the core metal 52. The core metal 52 of the worm wheel 51 in the press fit direction over the pinion shaft 2 is the same as in the first embodiment.

The method of fixing the outer race of the ball bearing 34 and the method of pivotally supporting the lower end of the pinion shaft 2 by means of the needle bearing 36 are the same as in the first embodiment. That is, also in the fourth embodiment, the pinion shaft 2 is supported in the thrust direction and the radial direction by the ball bearing 34 located directly under the worm wheel 51. Thus, the ball bearing 34 that supports the upper end of the pinion shaft 2 serves as the support reference for the pinion shaft 2 relative to the lower gear box 41.

Also, in this electric power steering apparatus 1 according to the fourth embodiment, the ball bearing 34 serving as the support reference for the pinion shaft 2 is located directly under the worm wheel 51. Thus, even when a temperature change occurs around the electric power steering apparatus, the engagement position between the worm wheel 51 and the worm 53 is always maintained in a normal engagement state.

Figure 5:
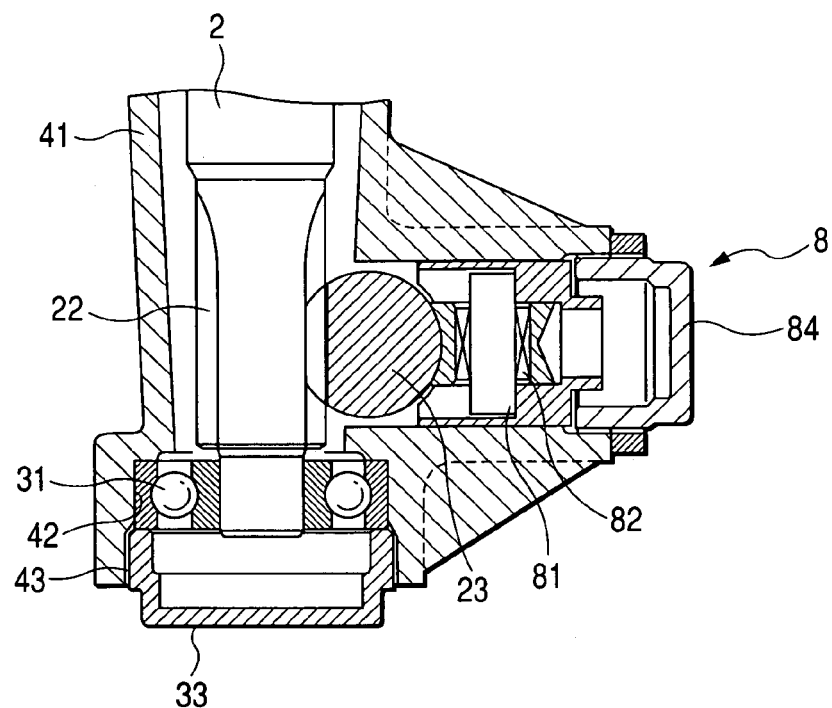
FIG. 5 is a longitudinal sectional view of a lower end of an electric power steering apparatus in which a lower end of a pinion shaft is supported pivotally by a ball bearing is in place of a needle bearing of the first to the fourth embodiments.

Described below with reference to FIG. 5 is an embodiment in which the lower end of the pinion shaft is supported pivotally by a ball bearing in place of the needle bearing 36 of the first to fourth embodiments. FIG. 5 is a longitudinal sectional view of the lower end of an electric power steering apparatus. In the following description, like parts to the embodiments described above are designated by like numerals, and overlapping description is omitted.

The lower end of the pinion shaft 2 is pivotally supported solely in the radial direction in the lower gear box 41 by a ball bearing 31. The outer race of the ball bearing 31 is pressed into a bearing hole 42 formed in the lower gear box 41. Then, the outer race of the ball bearing 31 is pressed by an end cover 33 screwed into a female screw 43 of the bearing hole 42 so that the outer race of the ball bearing 31 is fixed in the thrust direction in the lower gear box 41.

The lower end of the pinion shaft 2 is not fixed in the thrust direction relative to the inner race of the ball bearing 31. This allows the lower ball bearing 31 to absorb the expansion or contraction of the pinion shaft 2 caused by a temperature change.

In the electric power steering apparatus according to the invention, a bearing serving as the support reference for the pinion shaft is located directly under the worm wheel. Thus, even when a temperature change occurs around the electric power steering apparatus, the engagement position between the worm wheel and the worm does not shift in the axial direction of the pinion shaft. This ensures normal engagement, and hence avoids the generation of noise in the engagement part and the occurrence of wear in the gear tooth surface.

Furthermore, a bearing hole into which the outer race of the lower bearing is pressed and a bearing hole into which the outer race of the upper bearing is pressed are formed in a common gear box. At the same time, these two holes can be fabricated by through processing from one direction. This reduces the machining time, and yet improves the concentricity of the bearing holes so as to reduce the swing of the worm wheel.

Furthermore, the bearing hole into which the outer race of the upper bearing is pressed is formed directly in the gear box. This avoids the accumulation of working errors in the bearing holes, and hence improves the concentricity of the bearing holes so as to reduce the swing of the worm wheel.

Furthermore, in the rack, a thread relief is formed by extending the bottom surface of the rack teeth toward the outside of a stroke end (use range). Then, the pinion is located at the position of the thread relief during the work of tightening the ring nut. By virtue of this, even when the pinion revolves, the rack does not move. Thus, the work of tightening the ring nut can be completed by rotating the pinion as many revolutions as necessary. This reduces the necessary time for the assembling work.

What is claimed is:

1. An electric power steering apparatus comprising:
   a gear box;
   an input shaft inserted through the gear box;
   a pinion shaft, an upper end of which is connected to a lower end of the input shaft via a torsion bar spring, and which is accommodated in the gear box;
   a rack that engages with a pinion formed in a lower portion of the pinion shaft to transmit a steering force to a wheel side;
   a torque sensor that detects a torque acting on the torsion bar spring;
   an electric motor that outputs a predetermined steering assist force depending on a detected value in the torque sensor;
   a worm that is connected to an output shaft of the electric motor, and that engages with a worm wheel connected to an upper portion of the pinion shaft; and
   a first bearing that supports, directly under the worm wheel, the pinion shaft pivotally in a radial direction and a thrust direction relative to the gear box wherein
   the first bearing is a ball bearing, and
   an inner race of the ball bearing is clamped between a step formed in an outer periphery of the pinion shaft or a boss portion of the worm wheel and any one of a caulking ring, a retainer ring, and a nut attached to the pinion shaft.

2. The electric power steering apparatus according to claim 1, wherein
   in an outer race of the ball bearing,
   an outer periphery thereof is supported in a bearing hole of the gear box, and
   an axial direction thereof is fixed to the gear box by a hollow ring nut disposed between the ball bearing and the worm wheel.

3. The electric power steering apparatus according to claim 2, wherein
   an engaging recess is formed in a worm-wheel-side end face of the ring nut,
   a tool insertion hole opposing the engaging recess is formed in the worm wheel,
   a tightening tool is caused to engage with the engaging recess through the tool insertion hole from above the worm wheel, and
   the worm wheel and the pinion shaft are rotated so that the ring nut is screwed into the gear box.

4. The electric power steering apparatus according to claim 3, wherein
   in the rack,
   a thread relief that permits idling of the pinion is formed outside a stroke end of the rack, and
   when the ring nut is screwed into the gear box, the pinion freely revolves in the thread relief of the rack.

5. The electric power steering apparatus according to claim 1, wherein
   the pinion shaft is supported pivotally in a radial direction below the pinion in the gear box by a second bearing.

6. The electric power steering apparatus according to claim 5, wherein
   the second bearing is a needle bearing or a ball bearing.

7. The electric power steering apparatus according to claim 5, wherein
   outer races of the first bearing and the second bearing are attached to a common gear box.

8. The electric power steering apparatus according to claim 7, wherein
   the bearing hole in the gear box to which the outer races of the first bearing and the second bearing are attached can be fabricated by through processing from one direction.

* * * * *